United States Patent
Shin et al.

(10) Patent No.: US 9,977,271 B2
(45) Date of Patent: May 22, 2018

(54) LIQUID CRYSTAL DISPLAY

(71) Applicant: Samsung Display Co., Ltd., Yongin-si (KR)

(72) Inventors: Kyoung Ju Shin, Hwaseong-si (KR); Sung Hwan Kim, Yongin-si (KR); Se Young Song, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 103 days.

(21) Appl. No.: 15/000,633

(22) Filed: Jan. 19, 2016

(65) Prior Publication Data

US 2016/0223873 A1 Aug. 4, 2016

(30) Foreign Application Priority Data

Feb. 3, 2015 (KR) ........................ 10-2015-0016902

(51) Int. Cl.
*G02F 1/1333* (2006.01)
*G02F 1/1368* (2006.01)
(Continued)

(52) U.S. Cl.
CPC ...... *G02F 1/133345* (2013.01); *G02F 1/1368* (2013.01); *G02F 1/134309* (2013.01);
(Continued)

(58) Field of Classification Search
CPC ......... G02F 1/134309; G02F 1/134363; G02F 1/1368; G02F 1/133345
See application file for complete search history.

(56) References Cited

U.S. PATENT DOCUMENTS 7,206,050 B2    4/2007  Chae
7,573,459 B2    8/2009  Shih et al.
(Continued)

FOREIGN PATENT DOCUMENTS

KR    1020110038572    4/2011
KR    1020120055123    5/2012
(Continued)

OTHER PUBLICATIONS

European Search Report dated Apr. 29, 2015 in European Patent Application No. 16153986.1

*Primary Examiner* — Dung Nguyen
(74) *Attorney, Agent, or Firm* — H.C. Park & Associates, PLC

(57) ABSTRACT

A liquid crystal display including: a first substrate; a gate line and a data line formed or otherwise disposed on the first substrate; a drain electrode disposed on the first substrate; a first insulating layer disposed on the gate line and the data line; a first electrode disposed on the first insulating layer; a second insulating layer disposed on the first electrode; and a second electrode disposed on the second insulating layer. The first insulating layer and the second insulating layer have a first contact hole exposing a portion of the drain electrode. The contact portion of the second electrode is connected to the drain electrode through the first contact hole, and the contact portion overlaps the first electrode adjacent the first contact hole. The overlap increases capacitance of the display panel so as to decrease kickback voltage and reduce flicker.

12 Claims, 10 Drawing Sheets

(51) Int. Cl.
*G02F 1/1343* (2006.01)
*G02F 1/1362* (2006.01)
*G02F 1/1335* (2006.01)

(52) U.S. Cl.
CPC .. *G02F 1/134363* (2013.01); *G02F 1/136227* (2013.01); *G02F 1/13439* (2013.01); *G02F 1/133512* (2013.01); *G02F 1/136213* (2013.01); *G02F 2001/134372* (2013.01)

(56) References Cited

U.S. PATENT DOCUMENTS

| | | | |
|---|---|---|---|
| 7,751,002 B2 | 7/2010 | Hsu et al. | |
| 8,174,657 B2 | 5/2012 | Lim | |
| 8,404,528 B2 | 3/2013 | Liou | |
| 8,411,009 B2 | 4/2013 | Shiiba et al. | |
| 9,153,600 B2 * | 10/2015 | Ryu | H01L 27/1225 |
| 9,759,963 B2 * | 9/2017 | Oh | G02F 1/134363 |
| 2012/0105778 A1 | 5/2012 | Fujiyoshi et al. | |
| 2013/0027144 A1 | 1/2013 | Yamanaka et al. | |
| 2013/0112983 A1 | 5/2013 | Kao et al. | |
| 2014/0042444 A1 * | 2/2014 | Huang | G02F 1/136227 257/59 |
| 2015/0022766 A1 | 1/2015 | Kim et al. | |
| 2015/0070642 A1 | 3/2015 | Oh et al. | |
| 2016/0054625 A1 * | 2/2016 | Hsia | G02F 1/136227 349/43 |

FOREIGN PATENT DOCUMENTS

| | | |
|---|---|---|
| KR | 1020130052191 | 5/2013 |
| KR | 1020150030567 | 3/2015 |

\* cited by examiner

LIQUID CRYSTAL DISPLAY

CROSS-REFERENCE TO RELATED APPLICATION

This application claims priority from and the benefit of Korean Patent Application No. 10-2015-0016902, filed on Feb. 3, 2015, which is hereby incorporated by reference for all purposes as if fully set forth herein.

BACKGROUND

Field

Exemplary embodiments relate to a liquid crystal display.

Discussion of the Background

A liquid crystal display, which is one of the most common types of flat panel displays currently in use, is a display device which rearranges liquid crystal molecules of a liquid crystal layer by applying voltages to electrodes to control an amount of transmitted light.

The liquid crystal display has benefits in that it can be made lightweight and thin. However, it has a drawback in that lateral visibility is lower than front visibility. To solve these problems, liquid crystal arrangements and driving methods of various types have been developed. To realize a wide viewing angle, a liquid crystal display has been developed that forms a pixel electrode and a common electrode on one substrate.

In the liquid crystal display, at least one of two field generating electrodes of the pixel electrode and the common electrode has a plurality of cutouts, and a plurality of branch electrodes defined by the plurality of cutouts.

However, as a resolution of the liquid crystal display in which the pixel electrode and the common electrode are formed in one substrate is increased, an overlapping area of the pixel electrode and the common electrode is decreased, such that a magnitude of a kickback voltage of the liquid crystal display is increased.

As described above, when the magnitude of the kickback voltage is increased, a flicker may be generated that causes deterioration of the display quality.

The above information disclosed in this Background section is only for enhancement of understanding of the background of the inventive concept, and, therefore, it may contain information that does not form the prior art that is already known in this country to a person of ordinary skill in the art.

SUMMARY OF THE INVENTION

An exemplary embodiment provides a liquid crystal display that prevents display quality deterioration, such as a flicker due to a kickback voltage, by reducing the magnitude of the kickback voltage even when the resolution of the liquid crystal display is increased.

Additional aspects will be set forth in the detailed description which follows, and, in part, will be apparent from the disclosure, or may be learned by practice of the inventive concept.

An exemplary embodiment discloses a liquid crystal display that includes: a first substrate; a gate line and a data line disposed on the first substrate; a drain electrode disposed on the first substrate; a first insulating layer disposed on the gate line and the data line; a first electrode disposed on the first insulating layer; a second insulating layer disposed on the first electrode; and a second electrode disposed on the second insulating layer, wherein the first insulating layer and the second insulating layer have a first contact hole exposing a portion of the drain electrode, the contact portion of the second electrode is connected to the drain electrode through the first contact hole, and the contact portion overlaps the first electrode adjacent the first contact hole.

The first electrode may have a first opening larger than the contact hole, and the width of the drain electrode may be larger than the width of the first opening.

The first electrode may overlap the drain electrode near the first opening.

The liquid crystal display may further include a third insulating layer positioned between the first insulating layer and the first electrode, and the third insulating layer may have a second contact hole larger than the first contact hole.

The second contact hole may be larger than the first contact hole, and the contact portion may overlap the first electrode near the second contact hole.

The edge of the first opening may be positioned between the edge of the first contact hole and the edge of the second contact hole.

The liquid crystal display may further include a second substrate facing the first substrate, and a light blocking member formed on the first substrate or the second substrate, and the first contact hole may overlap the light blocking member.

The first electrode may have a plate shape, the second electrode may include a plurality of branch electrodes, and the plurality of branch electrodes of the second electrode may overlap the first electrode.

The foregoing general description and the following detailed description are exemplary and explanatory and are intended to provide further explanation of the claimed subject matter

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
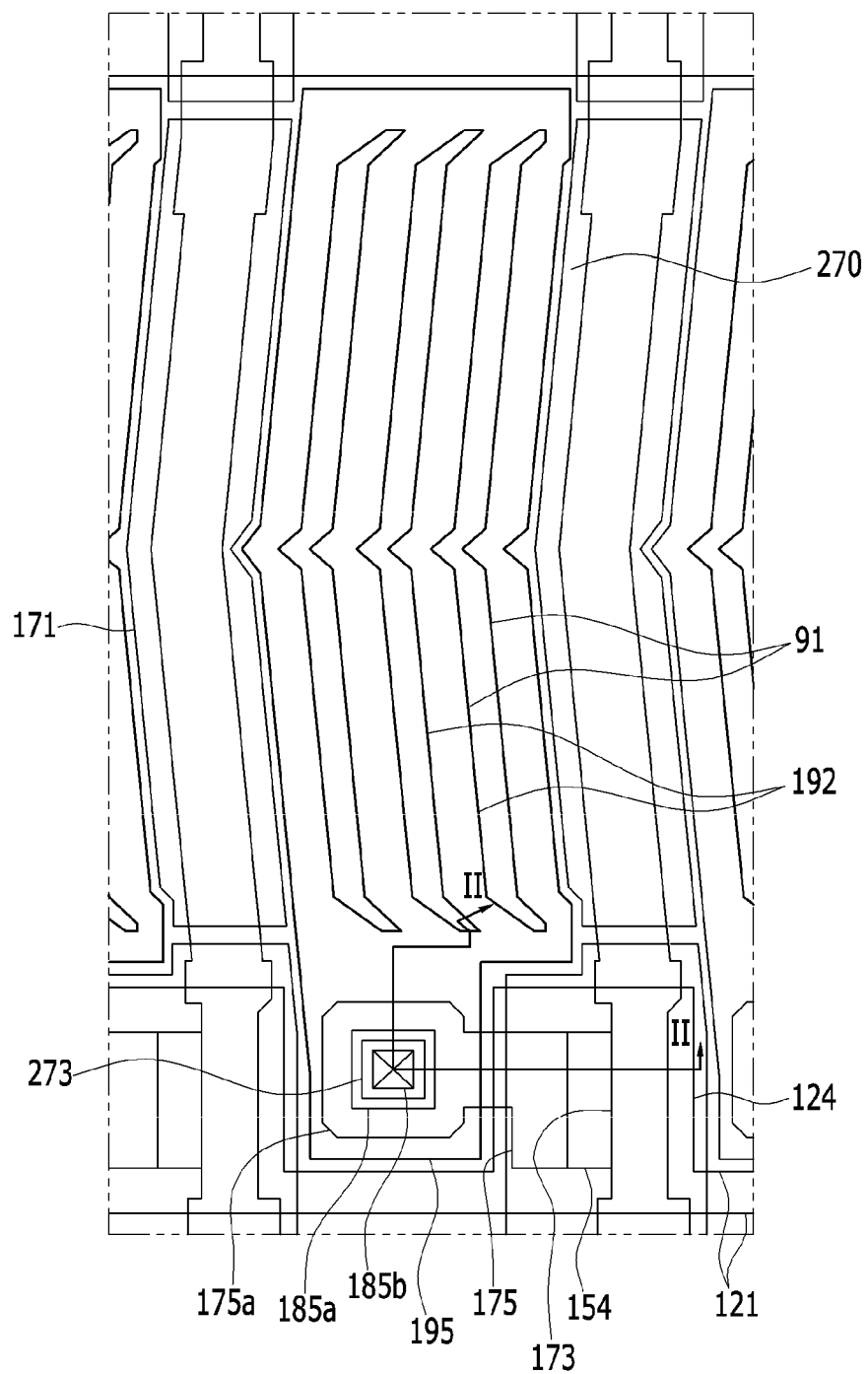
FIG. 1 is a layout view of a liquid crystal display according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 3:
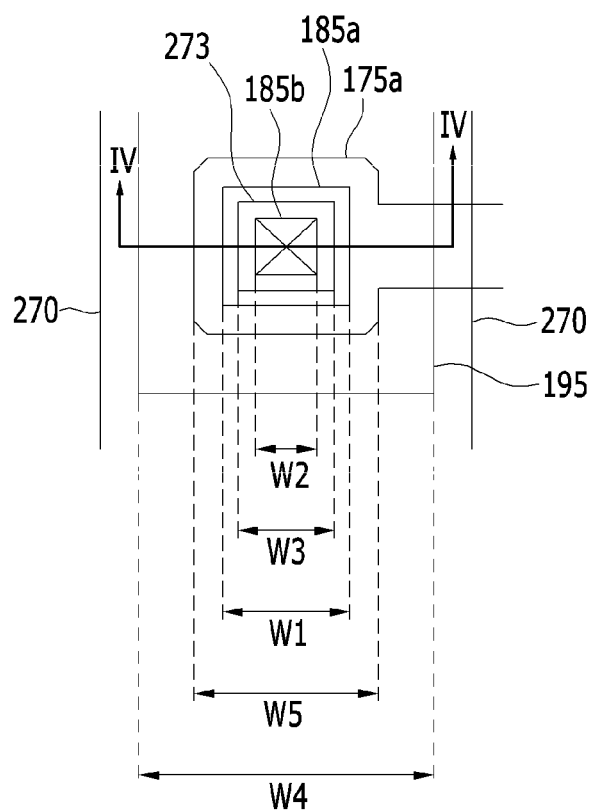
FIG. 3 is a view showing a portion of the liquid crystal display of FIG. 1.
Figure 4:
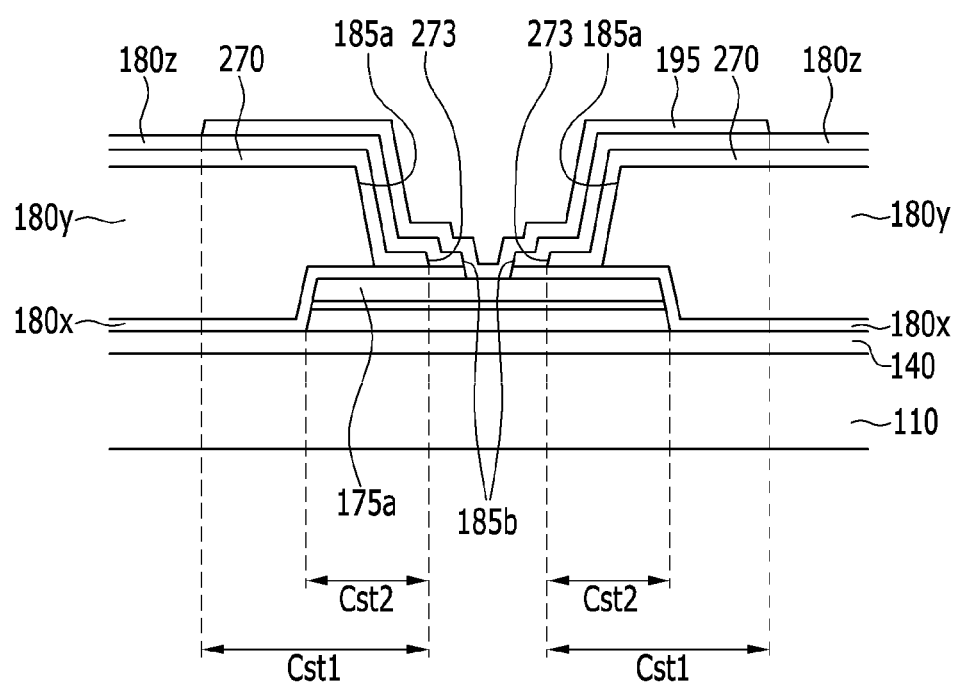
FIG. 4 is a cross-sectional view of FIG. 3.

A liquid crystal display according to an exemplary embodiment will be described with reference to FIG. 1, FIG. 2, FIG. 3, and FIG. 4. FIG. 1 is a layout view of a liquid crystal display according to an exemplary embodiment, FIG. 2 is a cross-sectional view of the liquid crystal display of FIG. 1 taken along line II-II, FIG. 3 is a view showing a portion of the liquid crystal display of FIG. 1, and FIG. 4 is a cross-sectional view of FIG. 3.

Figure 2:
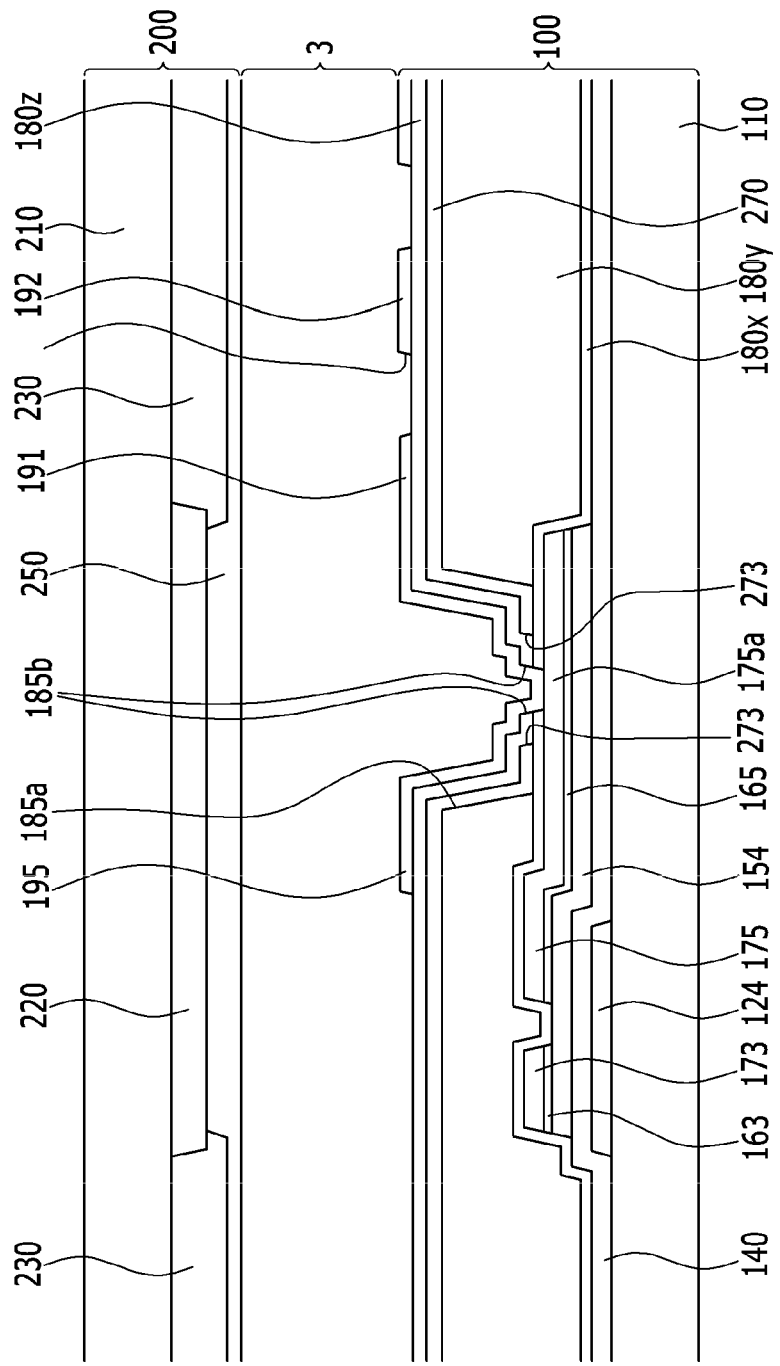
FIG. 2 is a cross-sectional view of the liquid crystal display of FIG. 1 taken along line II-II.

Referring to FIG. 1 and FIG. 2, a liquid crystal display according to an exemplary embodiment includes a lower panel 100 and an upper panel 200 facing each other, and a liquid crystal layer 3 interposed therebetween. Hereinafter, one pixel area is described as an example.

The lower panel 100 will be described.

A gate conductor including a gate line 121 is formed or otherwise disposed on a first substrate 110 made of transparent material such as glass, plastic, or the like.

The gate line 121 includes a gate electrode 124, and a wide end portion (not illustrated) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayer structure including at least two conductive layers having different physical properties.

A gate insulating layer 140 made of a silicon nitride ($SiN_x$), a silicon oxide ($SiO_x$), or the like is formed on the gate line 121. The gate insulating layer 140 may have a multilayer structure including at least two insulating layers having different physical properties.

A semiconductor layer 154 made of amorphous silicon or polysilicon is positioned on the gate insulating layer 140. The semiconductor 154 may include an oxide semiconductor.

Ohmic contacts 163 and 165 are formed on the semiconductor 154. The ohmic contacts 163 and 165 may be made of a material such as n+ hydrogenated amorphous silicon in which an n-type impurity such as phosphorus is doped at high concentration, or a silicide. The ohmic contacts 163 and 165 may be disposed on the semiconductor layer 154 to make a pair. In the case where the semiconductor layer 154 is an oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 includes a wide end portion (not illustrated) for connection with another layer or an external driving circuit. The data line 171 transfers a data signal and extends mainly in a vertical direction to cross the gate line 121.

In this case, the data line 171 may have a first curved portion having a curved shape in order to acquire maximum transmittance of the liquid crystal display, and the curved portion meets another in a middle region of the pixel area to have a V-lettered shape. A second curved portion, which is curved to form a predetermined angle with the first curved portion, may be further included in the middle region of the pixel area.

The source electrode 173 is a part of a data line 171, and is disposed on the same line as the data line 171. The drain electrode 175 is formed to extend in substantially parallel with the source electrode 173. Accordingly, the drain electrode 175 is substantially parallel with part of the data line 171.

The gate electrode 124, the source electrode 173, and the drain electrode 175 form one thin film transistor (TFT) together with the semiconductor layer 154, and a channel of the thin film transistor is formed in the semiconductor layer 154 portion between the source electrode 173 and the drain electrode 175.

The liquid crystal display according to the exemplary embodiment of the present invention includes the source electrode 173 positioned on the same line with the data line 171, and the drain electrode 175 extending in parallel with the data line 171. As a result, a width of the thin film transistor may be increased while an area occupied by the data conductor is not increased, thereby increasing an aperture ratio of the liquid crystal display.

The data line 171 and the drain electrode 175 may be made of a refractory metal such as molybdenum, chromium, tantalum, and titanium, or an alloy thereof, and may have a multilayered structure including a refractory metal layer (not illustrated) and a low resistive conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, the data line 171 and the drain electrode 175 may be made of various metals or conductors in addition to this.

A first passivation layer 180x is disposed on the data conductors 171, 173, and 175, the gate insulating layer 140, and exposed portions of the semiconductor 154. The first passivation layer 180x may be made of an inorganic insulating material.

A second passivation layer 180y is formed on the first passivation layer 180x. The second passivation layer 180y is an organic layer, and the second passivation layer 180y may be a color filter. When the second passivation layer 180y is the color filter, the second passivation layer 180y may uniquely display one of various primary colors. An example of the primary colors includes three primary colors, such as red, green, and blue, or yellow, cyan, and magenta. Although not illustrated, the color filter may further include a color filter displaying a combination color of the primary colors, or white.

A common electrode 270 is formed on the second passivation layer 180y. The common electrode 270, which may cover the entire surface of the pixel area, may be formed in the shape of one plate on the front of the substrate 110, and may have an opening 273 on a corresponding region around the drain electrode 175. That is, the common electrode 270 may be formed on the entire surface of the pixel area and may have a flat shape, such as a plate shape.

Common electrodes 270 disposed in adjacent pixels may be connected to each other to receive a common voltage having a predetermined magnitude supplied from a source outside of the display region.

A third passivation layer 180z is formed on the common electrode 270. The third passivation layer 180z may be made of an inorganic insulating material.

A pixel electrode 191 is formed on the third passivation layer 180z. The pixel electrode 191 is curved to be parallel to the curved portion of the data line 171. The pixel electrode 191 has a plurality of first cutouts 91, and includes a plurality of first branch electrodes 192 defined by the plurality of first cutouts 91.

The second passivation layer 180y has a first contact hole 185a, and the first passivation layer 180x and the third passivation layer 180z have a second contact hole 185b. The second contact hole 185b is positioned inside the first contact hole 185a.

A first contact portion 195 of the pixel electrode 191 is physically and electrically connected to the second contact portion 175a of the drain electrode 175 exposed through the first contact hole 185a and the second contact hole 185b, thereby receiving a voltage from the drain electrode 175.

Although not shown, a first alignment layer (not shown) may be formed on the pixel electrode 191 and the third passivation layer 180z, and the alignment layer may be a horizontal alignment layer and may be rubbed in a predetermined direction. However, according to a liquid crystal display according to another exemplary embodiment, the alignment layer may include a light reactive material to be photo-aligned.

Next, the upper panel 200 will be described.

A light blocking member 220 is formed on a second substrate 210 that is made of transparent material, such as glass or plastic. The light blocking member 220, also called a black matrix, prevents light leakage.

When the second passivation layer 180y of the first display panel 100 is not the color filter, a plurality of color filters 230 may be formed on the second substrate 210.

An overcoat 250 is formed on the color filter 230 and the light blocking member 220. The overcoat 250 may be made of an (organic) material, and prevents exposure of the color filters 230 and provides a flat surface. In another exemplary embodiment, the overcoat 250 may be omitted.

A second alignment layer (not shown) may be formed on the overcoat 250.

The liquid crystal layer 3 includes a liquid crystal material having positive dielectric anisotropy. Each liquid crystal molecule of the liquid crystal layer 3 has a direction of a major axis arranged in parallel with the display panels 100 and 200.

The pixel electrode 191 and the common electrode 270, which are field generating electrodes, generate an electric field. Thus the liquid crystal molecules of the liquid crystal layer 3 positioned on the two electrodes 191 and 270 rotate in a direction parallel to the direction of the electric field. Polarization of light passing through the liquid crystal layer varies according to the determined rotation directions of the liquid crystal molecules.

Next, the first contact hole 185a and the second contact hole 185b, the opening 273 of the common electrode 270, the first contact portion 195 of the pixel electrode 191, and a second contact portion 175a of the drain electrode 175 will be described with reference to FIG. 3 and FIG. 4.

With reference to the direction that the gate line 121 is extended, a first width W1 of the first contact hole 185a of the second passivation layer 180y including the organic material is wider than a second width W2 of the second contact hole 185b of the first passivation layer 180x and the third passivation layer 180z including the inorganic material. A third width W3 of the opening 273 of the common electrode 270 is less than the first width W1 of the first contact hole 185a and greater than the second width W2 of the second contact hole 185b.

The first contact portion 195 of the pixel electrode 191 is formed to cover all of the first contact hole 185a and the second contact hole 185b, and a fourth width W4 of the first contact portion 195 of the pixel electrode 191 is greater than the third width W3 of the opening 273 of the common electrode 270. Accordingly, the first contact portion 195 of the pixel electrode 191 and the common electrode 270 overlap at Cst1 adjacent the opening 273 of the common electrode 270. In this way, by overlapping the first contact portion 195 of the pixel electrode 191 and the common electrode 270 adjacent the opening 273 of the common electrode 270, the magnitude of the storage capacitance at Cst1 of the liquid crystal display is increased.

A fifth width W5 of the second contact portion 175a of the drain electrode 175 is greater than the third width W3 of the opening 273 of the common electrode 270. Accordingly, the second contact portion 175a of the drain electrode 175 and the common electrode 270 overlap at Cst2 adjacent the opening 273 of the common electrode 270. In this way, by overlapping the second contact portion 175a of the drain electrode 175 and the common electrode 270 adjacent the opening 273 of the common electrode 270, the magnitude of the storage capacitance at Cst2 of the liquid crystal display is increased.

Figure 5:
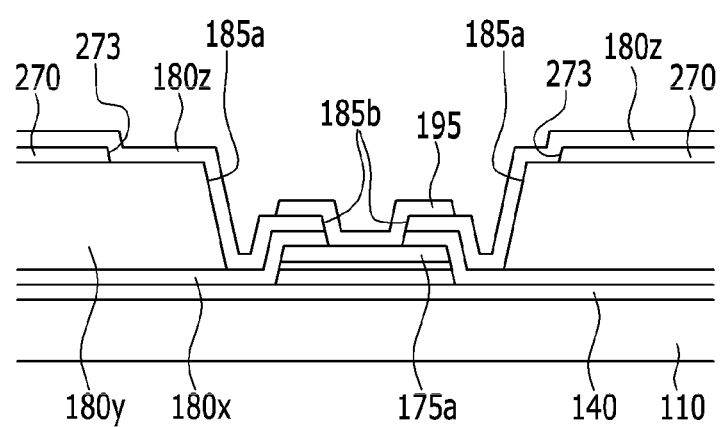
FIG. 5 is a cross-sectional view of a comparative liquid crystal display.

Next, a comparative liquid crystal display will be described with reference to FIG. 5. FIG. 5 is a cross-sectional view of a portion of a comparative liquid crystal display.

Referring to FIG. 5, a width of the first contact portion 195 of the pixel electrode of the comparative liquid crystal display is less than the width of the opening 273 of the common electrode 270, and the width of the second contact portion 175a of the drain electrode 175 is less than the width of the common electrode 270.

Accordingly, adjacent the opening 273 of the common electrode 270, the pixel electrode 191 and the common electrode 270 do not overlap, and the drain electrode 175 and the common electrode 270 do not overlap.

However, according to the liquid crystal display according to an exemplary embodiment, by overlapping the first contact portion 195 of the pixel electrode 191 and the common electrode 270 adjacent the opening 273 of the common electrode 270, the magnitude of the storage capacitance at Cst1 of the liquid crystal display is increased. Also, by overlapping the second contact portion 175a of the drain electrode 175 and the common electrode 270 adjacent the opening 273 of the common electrode 270, the magnitude of the storage capacitance at Cst2 of the liquid crystal display is increased.

In a case where the resolution of the liquid crystal display is increased, a number of the first branch electrodes 192 of the pixel electrode 191 is decreased, thereby an overlapping area of the common electrode 270 and the pixel electrode 191 is decreased. Accordingly, the storage capacitance of the liquid crystal display may be decreased.

On the other hand, since the kickback voltage of the liquid crystal display is inversely proportional to the storage capacitance of the storage capacitor of the liquid crystal display, if the magnitude of the storage capacitance of the liquid crystal display is increased, the magnitude of the kickback voltage of the liquid crystal display is decreased.

As described above, according to the liquid crystal display according to an exemplary embodiment, the magnitude of the storage capacitance of the liquid crystal display may be increased in the contact portion of the pixel electrode 191 and the drain electrode 175 of the liquid crystal display. Accordingly, when the resolution of the liquid crystal display is increased, the kickback voltage of the liquid crystal display is decreased, thereby preventing display quality deterioration such as the flicker due to kickback voltage.

Figure 6:
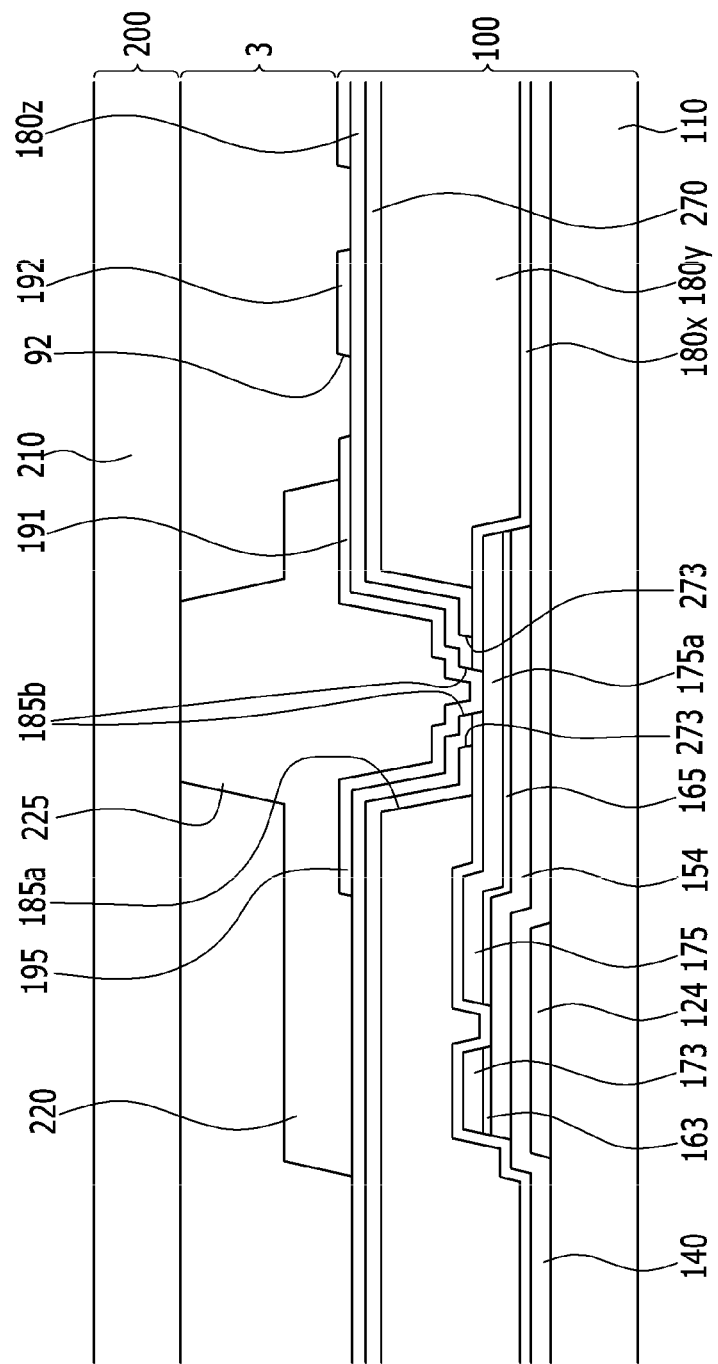
FIG. 6 is a cross-sectional view of a liquid crystal display according to another exemplary embodiment taken along line II-II of FIG. 1.

A liquid crystal display according to another exemplary embodiment will be described with reference to FIG. 6 as well as FIG. 1, FIG. 3, and FIG. 4. FIG. 6 is a cross-sectional view of a liquid crystal display according to another exemplary embodiment taken along line II-II of FIG. 1.

Referring to FIG. 6, the liquid crystal display according to the present exemplary embodiment is similar to the liquid crystal display according to the exemplary embodiment shown in FIG. 1 and FIG. 2. The detailed description of the same constituent elements will therefor be omitted.

Referring to FIG. 1 and FIG. 6, the liquid crystal display according to the exemplary embodiment of the present invention includes the lower panel 100 and the upper panel 200 facing each other and the liquid crystal layer 3 interposed therebetween.

The lower panel 100 will now be described.

A gate conductor including a gate line 121 is formed on a first substrate 110 made of transparent material such as glass, plastic, or the like.

The gate line 121 includes a gate electrode 124.

A gate insulating layer 140 is formed on the gate conductor 121.

A semiconductor 154 is formed on the gate insulating layer 140.

Ohmic contacts 163 and 165 are formed on the semiconductor 154.

A data conductor including a data line 171 including a source electrode 173 and a drain electrode 175 is formed on the ohmic contacts 163 and 165 and the gate insulating layer 140.

A first passivation layer 180x is formed on the data conductors 171, 173, and 175, the gate insulating layer 140, and the exposed portion of the semiconductor 154. A second passivation layer 180y is formed on the first passivation layer 180x. The second passivation layer 180y may be the organic layer and the second passivation layer 180y may be the color filter.

A common electrode 270 is formed on the second passivation layer 180y. The common electrode 270, which has a surface shape, may be formed in the shape of one plate on the front of the substrate 110 and may have an opening 273 on a corresponding region around the drain electrode 175.

A third passivation layer 180z is formed on the common electrode 270. The third passivation layer 180z may be made of the inorganic insulating material.

A pixel electrode 191 is formed on the third passivation layer 180z. The pixel electrode 191 has a plurality of first cutouts 91, and includes a plurality of first branch electrodes 192 defined by the plurality of first cutouts 91.

A first contact portion 195 of the pixel electrode 191 is physically and electrically connected to the second contact portion 175a of the drain electrode 175 exposed through the first contact hole 185a and the second contact hole 185b, thereby receiving a voltage from the drain electrode 175.

A light blocking member 220 and a spacer 225 are formed on the first contact portion 195 of the pixel electrode 191. The light blocking member 220 and the spacer 225 may be simultaneously formed with the same layer.

Although not shown, a first alignment layer (not shown) may be formed on the pixel electrode 191, the third passivation layer 180z, the light blocking member 220, and the spacer 225.

The upper panel 200 will now be described.

A second alignment layer (not shown) may be formed or otherwise disposed on a second substrate 210 made of transparent material, such as glass or plastic.

The liquid crystal layer 3 includes a liquid crystal material having positive dielectric anisotropy. Each liquid crystal molecule of the liquid crystal layer 3 has a direction of a major axis arranged in parallel with the display panels 100 and 200.

The pixel electrode 191 and the common electrode 270, which are field generating electrodes, generate an electric field, and thus, the liquid crystal molecules of the liquid crystal layer 3 positioned on the two electrodes 191 and 270 rotate in a direction parallel to the direction of the electric field. Polarization of light passing through the liquid crystal layer varies according to the determined rotation directions of the liquid crystal molecules.

In the liquid crystal display according to the present exemplary embodiment, as shown in FIG. 3 and FIG. 4, with reference to the direction that the gate line 121 is extended, a first width W1 of the first contact hole 185a of the second passivation layer 180y including the organic material is greater than a second width W2 of the second contact hole 185b of the first passivation layer 180x and the third passivation layer 180z including the inorganic material. A third width W3 of the opening 273 of the common electrode 270 is less than the first width W1 of the first contact hole 185a and wider than the second width W2 of the second contact hole 185b.

Also, the first contact portion 195 of the pixel electrode 191 is formed to cover all of the first contact hole 185a and the second contact hole 185b, and a fourth width W4 of the first contact portion 195 of the pixel electrode 191 is greater than the third width W3 of the opening 273 of the common electrode 270. Accordingly, the first contact portion 195 of the pixel electrode 191 and the common electrode 270 overlap at Cst1 adjacent the opening 273 of the common electrode 270. In this way, by overlapping the first contact portion 195 of the pixel electrode 191 and the common electrode 270 adjacent the opening 273 of the common electrode 270, the magnitude of the storage capacitance at Cst1 of the liquid crystal display is increased.

Also, a fifth width W5 of the second contact portion 175a of the drain electrode 175 is greater than the third width W3 of the opening 273 of the common electrode 270. Accordingly, the second contact portion 175a of the drain electrode 175 and the common electrode 270 overlap at Cst2 adjacent the opening 273 of the common electrode 270. In this way, by overlapping the second contact portion 175a of the drain electrode 175 and the common electrode 270 adjacent the opening 273 of the common electrode 270, the magnitude of the storage capacitance at Cst2 of the liquid crystal display is increased.

In the liquid crystal display according to an exemplary embodiment of the present invention, by overlapping the first contact portion 195 of the pixel electrode 191 and the common electrode 270 adjacent the opening 273 of the common electrode 270, the magnitude of the storage capacitance at Cst1 of the liquid crystal display is increased. Also, by overlapping the second contact portion 175a of the drain electrode 175 and the common electrode 270 adjacent the opening 273 of the common electrode 270, the magnitude of the storage capacitance at Cst2 of the liquid crystal display is increased.

In a case where the resolution of the liquid crystal display is increased, a number of the first branch electrodes 192 of the pixel electrode 191 is decreased, thereby an overlapping area of the common electrode 270 and the pixel electrode 191 is decreased. Accordingly, the storage capacitance of the liquid crystal display may be decreased.

However, since the kickback voltage of the liquid crystal display is inversely proportional to the storage capacitance of the storage capacitor of the liquid crystal display, if the magnitude of the storage capacitance of the liquid crystal display is increased, the magnitude of the kickback voltage of the liquid crystal display is decreased.

As described above, according to the liquid crystal display according to an exemplary embodiment, the magnitude of the storage capacitance of the liquid crystal display may be increased in the contact portion of the pixel electrode 191 and the drain electrode 175 of the liquid crystal display. Accordingly, when the resolution of the liquid crystal display is increased, the kickback voltage of the liquid crystal display is decreased, thereby preventing deterioration in display quality, such as undesirable flicker due to the kickback voltage.

Figure 7:
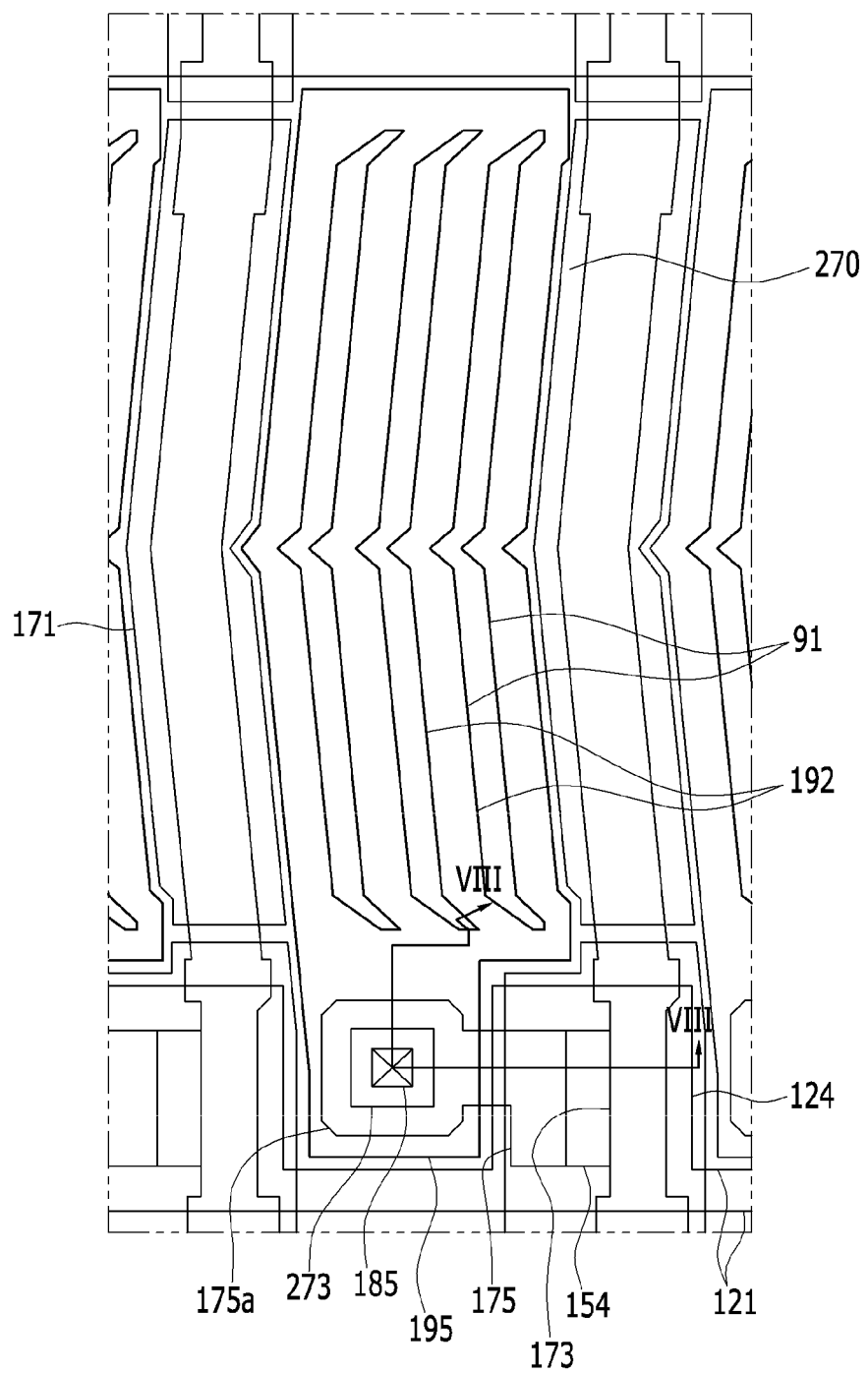
FIG. 7 is a layout view of a liquid crystal display according to another exemplary embodiment.
Figure 8:
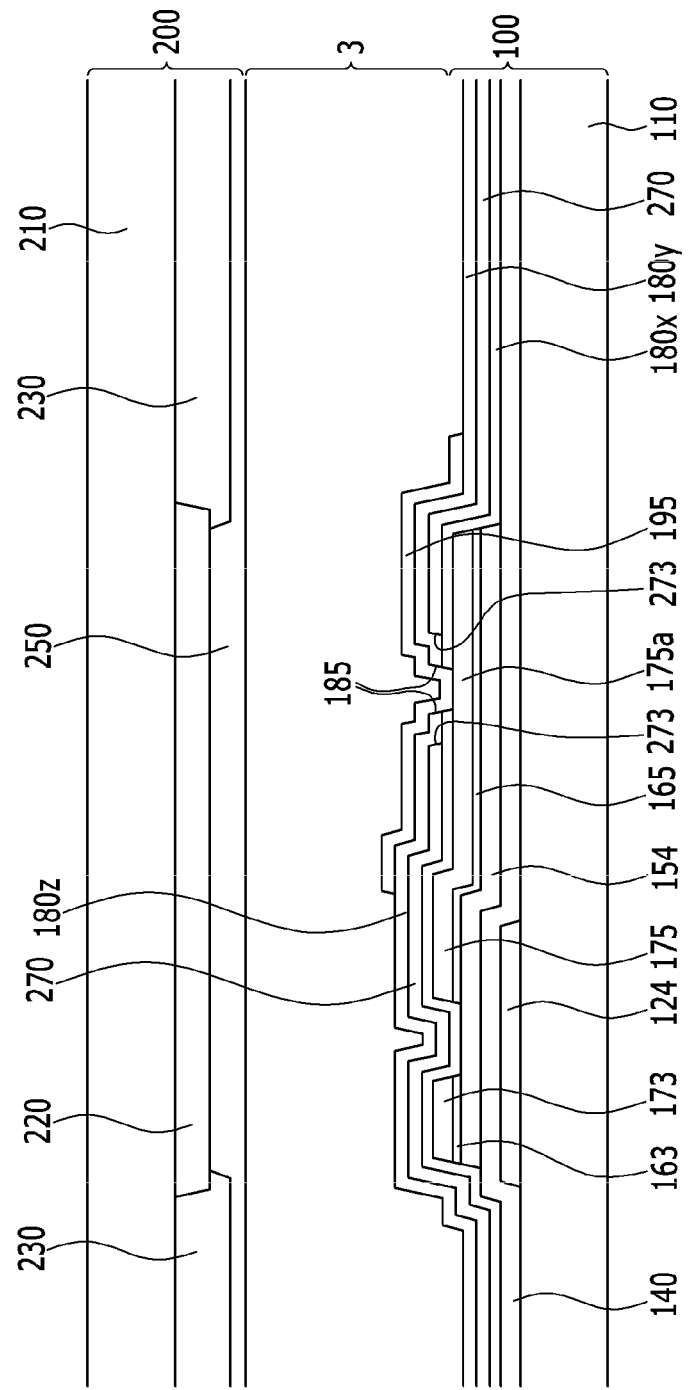
FIG. 8 is a cross-sectional view of the liquid crystal display of FIG. 7 taken along line VIII-VIII.
Figure 9:
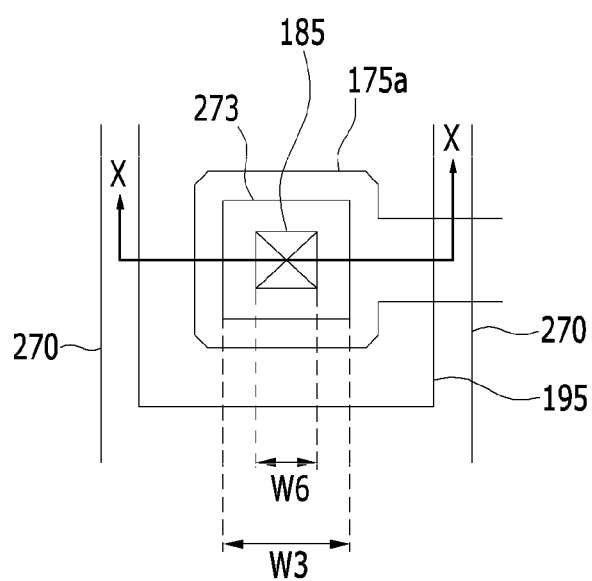
FIG. 9 is a view showing a portion of the liquid crystal display of FIG. 6.
Figure 10:
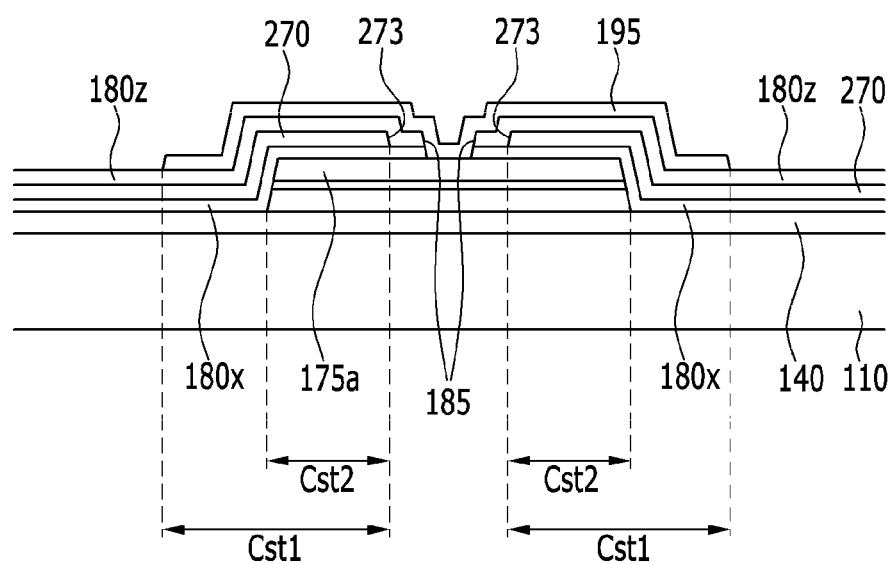
FIG. 10 is a cross-sectional view of FIG. 9.

Next, a liquid crystal display according to another exemplary embodiment will be described with reference to FIG. 7, FIG. 8, FIG. 9, and FIG. 10. FIG. 7 is a layout view of a liquid crystal display according to another exemplary embodiment, and FIG. 8 is a cross-sectional view of the liquid crystal display of FIG. 7 taken along line VIII-VIII. FIG. 9 is a view showing a portion of the liquid crystal display of FIG. 6, and FIG. 10 is a cross-sectional view of FIG. 9.

Referring to FIG. 7 and FIG. 8, the liquid crystal display according to the present exemplary embodiment is similar to the liquid crystal display according to the exemplary embodiment shown in FIG. 1 and FIG. 2. The detailed description for the same constituent elements will therefor be omitted.

Referring to FIG. 7 and FIG. 8, the liquid crystal display according to the exemplary embodiment includes the lower panel 100 and the upper panel 200 facing each other, and the liquid crystal layer 3 interposed therebetween.

The lower panel 100 will be described.

A gate conductor including a gate line 121 is formed or otherwise disposed on a first substrate 110 made of transparent material such as glass, plastic, or the like.

The gate line 121 includes a gate electrode 124.

A gate insulating layer 140 is formed on the gate conductor 121.

A semiconductor 154 is formed on the gate insulating layer 140.

Ohmic contacts 163 and 165 are formed on the semiconductor 154.

Data conductors, including a data line 171, a source electrode 173, and a drain electrode 175, are formed on the ohmic contacts 163 and 165 and the gate insulating layer 140.

A first passivation layer 180x is formed on the data conductors 171, 173, and 175, the gate insulating layer 140, and the exposed portion of the semiconductor 154. A common electrode 270 is formed on the first passivation layer 180x. The common electrode 270, may be formed in the shape of one plate on the front of the substrate 110, and may have an opening 273 on a corresponding region around the drain electrode 175.

A third passivation layer 180z is formed on the common electrode 270. The third passivation layer 180z may be made of the inorganic insulating material.

A pixel electrode 191 is formed on the third passivation layer 180z. The pixel electrode 191 has a plurality of first cutouts 91, and includes a plurality of first branch electrodes 192 defined by the plurality of first cutouts 91.

The first contact portion 195 of the pixel electrode 191 is physically and electrically connected to the second contact portion 175a of the drain electrode 175 through the contact hole 185, thereby receiving a voltage from the drain electrode 175.

Although not shown, a first alignment layer (not shown) may be formed on the pixel electrode 191 and the third passivation layer 180z.

Now, the upper panel 200 will be described.

A light blocking member 220 is formed on a second substrate 210 made of transparent material such as glass or plastic. A second alignment layer (not shown) may be formed on the light blocking member 220.

The liquid crystal layer 3 includes a liquid crystal material having positive dielectric anisotropy. Each liquid crystal molecule of the liquid crystal layer 3 has a direction of a major axis arranged in parallel with the display panels 100 and 200.

The pixel electrode 191 and the common electrode 270, which are field generating electrodes, generate an electric field. Thus, the liquid crystal molecules of the liquid crystal layer 3 positioned on the two electrodes 191 and 270 rotate in a direction parallel to the direction of the electric field. Polarization of light passing through the liquid crystal layer varies according to the determined rotation directions of the liquid crystal molecules.

Next, the contact hole 185, the opening 273 of the common electrode 270, the first contact portion 195 of the pixel electrode 191, and the second contact portion 175a of the drain electrode 175 will be described with reference to FIG. 9 and FIG. 10.

With reference to the extending direction of the gate line 121, a sixth width W6 of the contact hole 185 of the first passivation layer 180x and the third passivation layer 180z including the inorganic material is narrower than the third width W3 of the opening 273 of the common electrode 270.

Also, the first contact portion 195 of the pixel electrode 191 is formed to cover the contact hole 185, and the fourth width W4 of the first contact portion 195 of the pixel electrode 191 is wider than the third width W3 of the opening 273 of the common electrode 270. Accordingly, the first contact portion 195 of the pixel electrode 191 and the common electrode 270 overlap at Cst1 adjacent the opening 273 of the common electrode 270. In this way, by overlapping the first contact portion 195 of the pixel electrode 191 and the common electrode 270 adjacent the opening 273 of the common electrode 270, the storage capacitance at Cst1 of the liquid crystal display is increased.

Also, the fifth width W5 of the second contact portion 175a of the drain electrode 175 is greater than the third width W3 of the opening 273 of the common electrode 270. Accordingly, the second contact portion 175a of the drain electrode 175 and the common electrode 270 overlap at Cst2 adjacent the opening 273 of the common electrode 270. In this way, by overlapping the second contact portion 175a of the drain electrode 175 and the common electrode 270 adjacent the opening 273 of the common electrode 270, the storage capacitance at Cst2 of the liquid crystal display is increased.

In a liquid crystal display according to an exemplary embodiment of the present invention, by overlapping the first contact portion 195 of the pixel electrode 191 and the common electrode 270 at Cst1 adjacent the opening 273 of the common electrode 270, the storage capacitance of the liquid crystal display is increased. Additionally, by overlapping the second contact portion 175a of the drain electrode 175 and the common electrode 270 at Cst2 adjacent the opening 273 of the common electrode 270, the storage capacitance of the liquid crystal display is increased.

Therefore, in a liquid crystal display according to an exemplary embodiment, even though the resolution of the liquid crystal display may be increased, the magnitude of the kickback voltage of the liquid crystal display is decreased, thereby preventing the display quality deterioration such as the flicker due to the kickback voltage.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
   a gate line and a data line disposed on a first substrate;
   a drain electrode disposed on the first substrate;
   a first insulating layer disposed on the drain electrode;
   a first electrode disposed on the first insulating layer adjacent the drain electrode;
   a second insulating layer disposed on the first electrode;
   a second electrode disposed on the second insulating layer; and
   a third insulating layer disposed between the first insulating layer and the first electrode,
   wherein:
   the first insulating layer and the second insulating layer comprise a first contact hole having a first width exposing a portion of the drain electrode;
   the first electrode comprises a first opening surrounding the first contact hole and having a second width larger than the first width;

the third insulating layer has a second contact hole overlapping the first contact hole and having a third width;

a contact portion of the second electrode is connected to the drain electrode through the first contact hole;

the contact portion overlaps the first electrode by a predetermined distance in a width direction from the opening in the first electrode adjacent the first contact hole, and the second width is larger than the first width and smaller than the third width.

2. The liquid crystal display of claim 1, wherein:

a fourth width of the drain electrode is greater than the second width of the first opening.

3. The liquid crystal display of claim 2, wherein the first electrode overlaps the drain electrode by a predetermined distance in a width direction from the opening in the first electrode adjacent the first opening.

4. The liquid crystal display of claim 3, wherein:

the contact portion overlaps the first electrode adjacent the second contact hole.

5. The liquid crystal display of claim 4, wherein an edge of the first opening is positioned between an edge of the first contact hole and an edge of the second contact hole in a plan view.

6. The liquid crystal display of claim 5, further comprising:

a second substrate facing the first substrate; and a light blocking member disposed on one of the first substrate and the second substrate, wherein the first contact hole overlaps the light blocking member.

7. The liquid crystal display of claim 6, wherein:

the first electrode comprises a plate shape;

the second electrode comprises a plurality of branch electrodes; and the branch electrodes of the second electrode overlap the first electrode.

8. The liquid crystal display of claim 1, wherein the contact portion overlaps the first electrode adjacent the second contact hole.

9. The liquid crystal display of claim 8, further comprising:

a second substrate facing the first substrate; and a light blocking member disposed on one of the first substrate and the second substrate, wherein the first contact hole overlaps the light blocking member.

10. The liquid crystal display of claim 9, wherein:

the first electrode comprises a plate shape;

the second electrode comprises a plurality of branch electrodes; and the branch electrodes of the second electrode overlap the first electrode.

11. The liquid crystal display of claim 1, further comprising:

a second substrate facing the first substrate; and a light blocking member disposed on the first substrate or the second substrate, wherein the first contact hole overlaps the light blocking member.

12. The liquid crystal display of claim 11, wherein:

the first electrode comprises a plate shape;

the second electrode comprises a plurality of branch electrodes; and the branch electrodes of the second electrode overlap the first electrode.

* * * * *